(12) United States Patent
Pepin

(10) Patent No.: US 7,716,246 B2
(45) Date of Patent: May 11, 2010

(54) DYNAMIC MECHANISM FOR PROVIDING METADATA

(75) Inventor: Brian K. Pepin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 335 days.

(21) Appl. No.: 11/291,703

(22) Filed: Nov. 30, 2005

(65) Prior Publication Data

US 2007/0124334 A1 May 31, 2007

(51) Int. Cl.
*G06F 17/30* (2006.01)
(52) U.S. Cl. ...................................... 707/791; 717/111
(58) Field of Classification Search ................. 707/791; 717/111
See application file for complete search history.

(56) References Cited

U.S. PATENT DOCUMENTS

| | | | |
|---|---|---|---|
| 6,662,199 B1 * | 12/2003 | Flight et al. ............... 707/104.1 |
| 6,883,172 B1 * | 4/2005 | Angeline et al. ............ 719/315 |
| 2002/0169788 A1 * | 11/2002 | Lee et al. .................. 707/104.1 |
| 2003/0028451 A1 * | 2/2003 | Ananian ...................... 705/27 |
| 2006/0129599 A1 * | 6/2006 | Hammerich ............. 707/104.1 |
| 2006/0179035 A1 * | 8/2006 | Broker .......................... 707/3 |

* cited by examiner

*Primary Examiner*—Hosain T Alam
*Assistant Examiner*—Johnese Johnson
(74) *Attorney, Agent, or Firm*—Woodcock Washburn LLP

(57) ABSTRACT

Dynamic metadata allows for metadata that can be configured for an application programming interface (API) after the API has shipped. Multiple entities can provide metadata for the same API or portions of an API. The metadata provided for an API can be set up for each application domain, allowing customization within a single process. Metadata can be provided in several ways, including traditional compiled code and declarative markup as well as databases and other more dynamic approaches. Metadata is separated from its runtime components, so that the metadata that is used by the runtime components can be changed. For example, metadata may be declared on the objects separately. The metadata is then tied back to the runtime components.

13 Claims, 5 Drawing Sheets

DYNAMIC MECHANISM FOR PROVIDING METADATA

BACKGROUND

One of the features common to modern object oriented frameworks is the concept of metadata. Metadata provides additional information about a file, class, or member of another component of a class hierarchy, for example. The Microsoft Common Language Runtime (CLR) is the heart of the MICROSOFT .NET framework, and provides the execution environment for .NET code. The CLR uses metadata for diverse needs that range from tool support to marshaling characteristics. The CLR supports the addition of these attributes at compile time through the use of a special syntax. For example, to indicate that a member variable should be stored in thread local storage, one may place an attribute on the variable:

```
[ThreadStatic]
private string perThreadString;
```

In this example, tying the attribute into the source code is proper, because the source code breaks if the attribute is not present. Sometimes this is not desirable, however. Consider:

```
[Editor(typeof(ColorEditor))]
public class Color { }
```

This attribute specifies the type of user interface to instantiate if a user is to edit an instance of a color object. It provides an extensibility point so third parties can provide their own data types that can be seamlessly edited in applications. However, many color editors exist. Therefore, choosing a color editor at compile time is incorrect. But, if there is no way to provide for a class to specify an editor at compile time, third parties would be prevented from adding new types to the system, as they could not be edited until applications are written to support them.

CLR metadata contains more than attributes as described above. Late binding mechanisms such as reflection discover types, methods, and other members through metadata. Code running in the CLR uses metadata to link members and classes of different modules. Therefore, metadata defines the contract of the application programming interface (API) of a class library.

Sometimes it may be useful to modify this contract. For example, the .NET compact framework is a strict subset of the .NET framework that is available on the desktop. The compact framework cannot be instantiated on a desktop personal computer, however. Because it is a strict subset of the desktop framework, whenever an instance of a compact framework object needs to be instantiated, applications will instead create an instance of the corresponding desktop object. This poses a problem when late bound technologies such as reflection are used to inspect the created object. Consider a class called Font that represents a system font. Reflecting on the desktop object will expose properties and lists of available fonts that are not available on the compact framework's Font class. This problem is not limited to the compact framework.

Additionally, versioning an API is another way this problem is introduced. Consider an application that allows the production of HTML files. The file may be written to correspond to HTML 4.0 or 3.2. Applications traditionally hardwire the API schema for each version. This technique breaks down when the schema is not known ahead of time, as it is for scenarios where third party extensibility is involved.

SUMMARY

Dynamic metadata allows for metadata that can be configured for an API after the API has shipped. Multiple entities can provide metadata for the same API or portions of an API. The metadata provided for an API can be set up for each application domain, allowing customization within a single process. Metadata can be provided in several ways, including traditional compiled code and declarative markup as well as databases and other more dynamic approaches.

Metadata is separated from its runtime components, so that the metadata that is used by the runtime components can be changed. For example, metadata may be declared on the objects separately. The metadata is then tied back to the runtime components.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Abstraction levels continue to rise in the software industry. Code itself is no longer a sufficient description and desirably includes rich metadata to describe additional intent. This metadata may drive program flow and enable new features. By allowing metadata to be customized after the underlying framework classes, on which a program is built, have shipped, applications can remain agile and additional features can be added.

Figure 1:
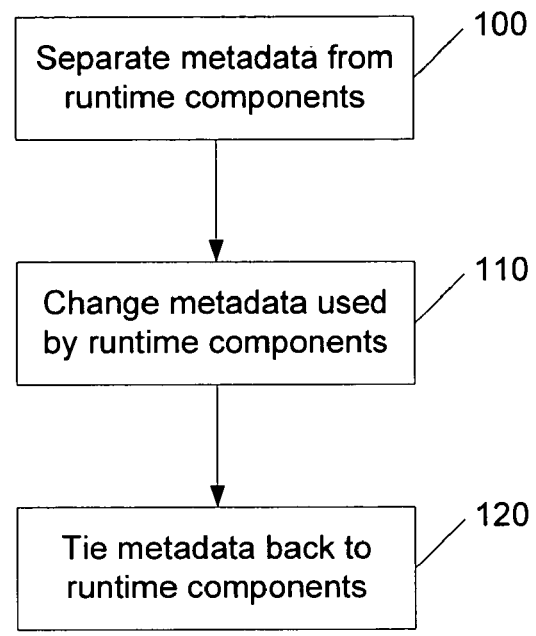
FIG. 1 is a flow diagram of an exemplary process of providing metadata.

FIG. 1 is a flow diagram of an exemplary process of providing metadata. The metadata is separated from its runtime components, at step 100. It is noted that the metadata is not part of the runtime components to begin with, and this separation remains, the separation may happen before compiling the source code (e.g., the programmer does not include metadata in the source code), or after compilation of the source code. In any event, the deployed runtime assembly desirably does not contain metadata. For example, metadata may be declared on the objects separately. The metadata is then tied back to the runtime components, at step 120. Tieback may be explicit or implicit, for example. In an example of explicit tieback, a programmer would like to use a specific table of metadata and writes code to explicitly add that metadata to the metadata store. In an example of implicit tieback, the metadata itself is adorned with metadata that can be used in a query. An end developer provides query information when creating an application domain and this query information is used to locate the metadata tables on the system that satisfy the query. The tables are then added into the metadata store in much the same way that a programmer would in the explicit case.

More particularly, dynamic metadata allows for metadata that can be configured for an application programming interface (API) after the API has shipped. Multiple entities can provide metadata for the same API or portions of an API. The metadata provided for an API can be set up for each application domain, allowing customization within a single process. Metadata can be provided in several ways, including traditional compiled code and declarative markup as well as databases and other more dynamic approaches.

Figure 2:
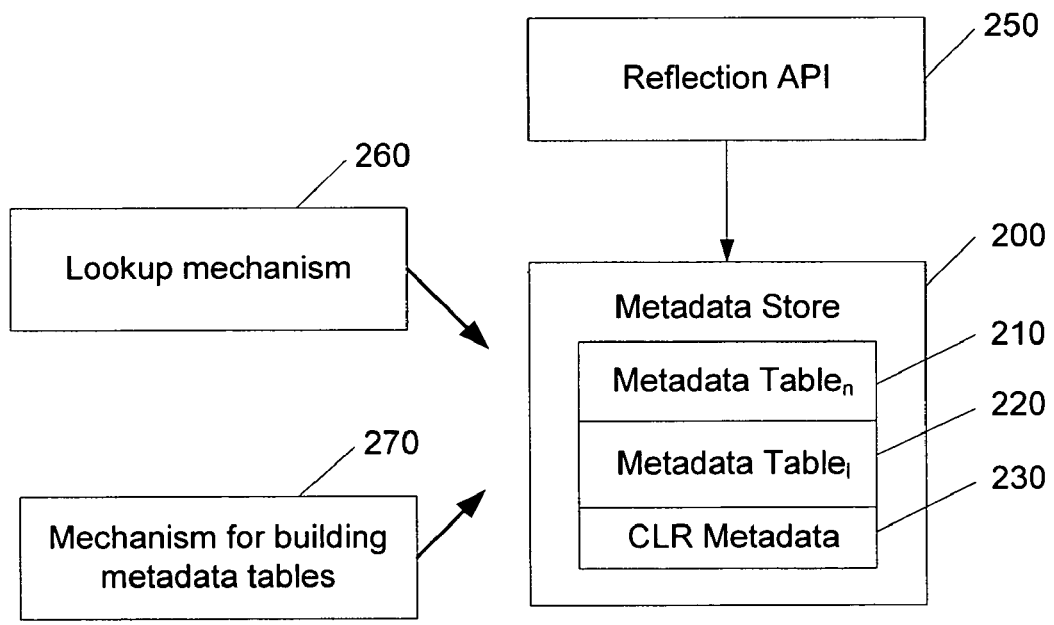
FIG. 2 is a diagram showing metadata store interaction with reflection and metadata tables.

FIG. 2 is a diagram showing metadata store interaction with reflection and metadata tables. A metadata store 200 contains one or more metadata tables 210, 220 and acts as a supplier of CLR metadata 230 to reflection APIs 250. Reflection is a framework for learning about classes during runtime. An example reflection API represents, or reflects, classes, interfaces, and objects. With a reflection API, the following may be performed, for example: determine the class of an object; get information about a class's modifiers, fields, methods, constructors, and superclasses; determine which constants and method declarations belong to an interface; create an instance of a class whose name is not known until runtime; get and set the value of an object's field, even if the field name is unknown to the program until runtime; invoke a method on an object, even if the method is not known until runtime; and create a new array, whose size and component type are not known until runtime, and then modify the array's components.

A lookup mechanism 260 provides the metadata store 200 with appropriate metadata tables. A mechanism 270 is provided for building metadata tables.

The metadata store 200 desirably is an object that maintains a list of metadata tables. Each table 210, 220 contains custom metadata for one or more classes. The metadata store 200 may use these tables 210, 220 to provide metadata through the CLR's reflection API 250. An example metadata store builds off of existing extensibility points in the CLR and .NET framework.

Figure 3:
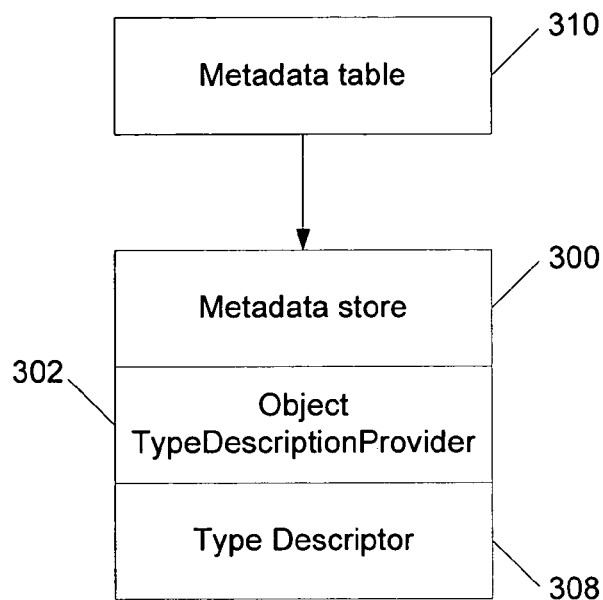
FIG. 3 is a diagram showing a metadata table residing on a metadata store that comprises two description providers.

An API may be provided through which custom metadata can be authored. FIG. 3 is a diagram showing a metadata table 310 residing on a metadata store 300 that comprises a description provider 302. The metadata store 300 desirably declares a custom type description provider 302 for a type. This is the provider that performs the metadata insertion for the metadata store 300.

An example API for the metadata store is as follows:

```
public static class MetadataStore {
    public static void AddAttributeTable(AttributeTable table);
}
```

The AttributeTable object desirably contains a set of metadata customizations for a group of types. When AddAttributeTable is called on the metadata store, the store takes the provided table and inserts it in its list of tables. It then tells the reflection system that the reflected information for all types that are customized in the table may have changed, which is used to clear caching information throughout the application domain.

When a table is added to the metadata store, the attributes defined in that table become available through queries, such as TypeDescriptor 308 queries. In the example, if a type had already been queried and the table contains additional attributes for the type, a TypeDescriptor.Refresh event may be raised to report that the type's metadata has changed.

Metadata tables (which may also be referred to as attribute tables) are essentially read only dictionaries, and the keys and values are computed separately. It is very efficient to ask a metadata table if it contains attributes for a particular type. The actual set of attributes desirably is demand created. It is noted that attributes may be considered to be a kind of metadata.

Metadata tables may not support arbitrary attributes on fields or methods. Metadata tables are desirably sealed classes that pass data from one point to another.

An example API for a metadata table is as follows:

```
public sealed class AttributeTable {
    private AttributeTable( );
    public bool Contains Attributes(Type type);
    public IEnumerable<Type> GetAttributedTypes( );
    public IEnumerable GetCustomAttributes(Type type);
    public IEnumerable GetCustomAttributes(Type ownerType,
        MemberDescriptor
    descriptor);
        public IEnumerable GetCustomAttributes(Type ownerType,
        DependencyProperty dp);
        public IEnumerable GetCustomAttributes(Type ownerType,
        MemberInfo member);
        public IEnumerable GetCustomAttributes(Type ownerType,
        string memberName);
}
```

In this example, the AttributeTable class may contain custom attributes for a type, or a member on that type. The attribute table offers several overloads to return attributes for members given a variety of inputs. The attribute table also offers a very fast way to query if the table contains attributes for a given type, and can also return an enumeration of all types in the table that have custom attribute overrides. This allows a metadata store to very efficiently know what types need to be required when an attribute table is added.

Figure 4:
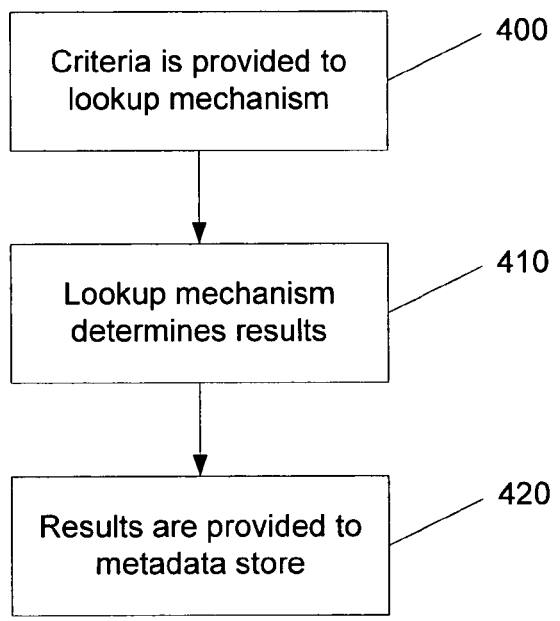
FIG. 4 is a diagram of an example lookup mechanism.

A lookup mechanism 260 provides metadata tables 210, 220 to the metadata store 200. FIG. 4 is a diagram of an example lookup mechanism. The lookup mechanism may contain an index of installed metadata tables along with a set of query criteria that is published with the table. A user may provide criteria to the lookup mechanism at step 400, and the lookup mechanism 260 finds or determines the results at step 410. The lookup mechanism then desirably injects the results into the metadata store 200 at step 420. A metadata table can be registered with the Global Assembly Cache (GAC) and will be loaded when types that have metadata contained in the table are loaded.

Automatic loading of metadata tables is useful but does not provide the ability for applications to choose which metadata tables get loaded. To facilitate this, metadata category information can be provided to an application domain. This category information may be used to choose which tables get loaded into the metadata store.

Before a metadata table can be added to the GAC and found or located by the lookup mechanism, it must be built or defined. Metadata tables can be built or generated in a variety of ways, such as imperative code, declarative markup, and splitting metadata from source.

Figure 5:
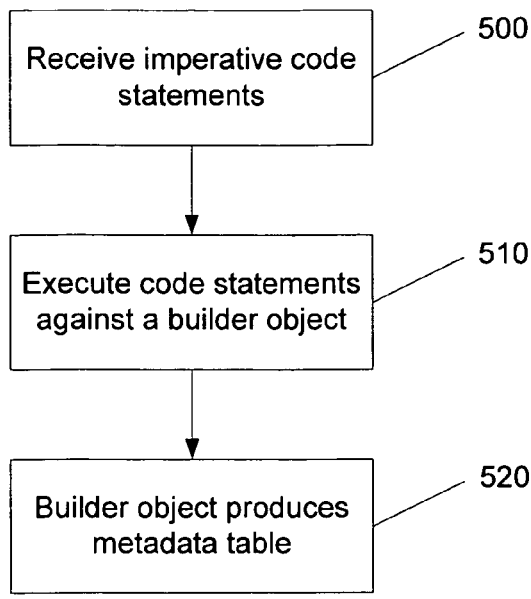
FIG. 5 is a diagram of an example imperative code process.

FIG. 5 is a diagram of an example imperative code process. Imperative code is received at step 500, and code statements are executed against a builder object at step 510. A metadata table can be constructed by executing code statements against the builder object. The builder object is desirably requested at step 520 to produce a metadata table which can be provided directly to the metadata store.

Figure 6:
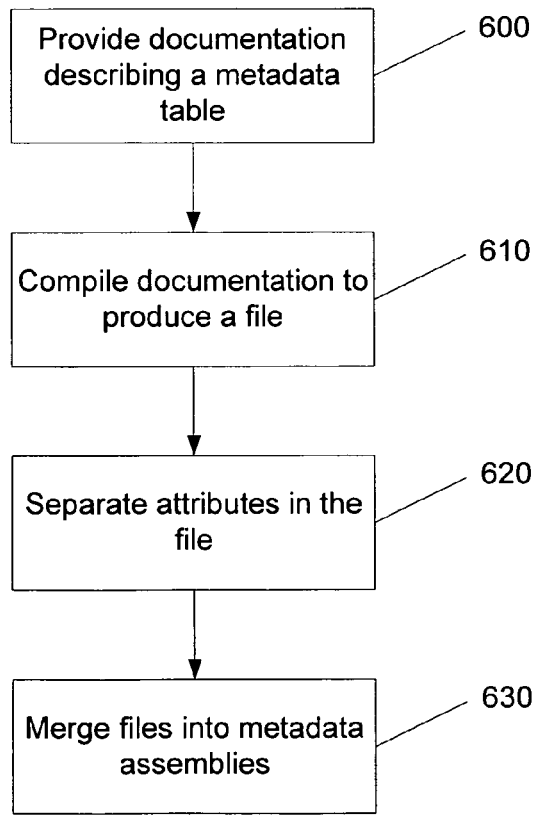
FIG. 6 is a diagram of an example declarative markup process.

Regarding declarative markup, a declarative format such as XML can be used to describe a metadata table. FIG. 6 is a diagram of an example declarative markup process. A seamless approach to this is to leverage the XML documentation format. The XML documentation format allows a compiler to produce an XML file containing documentation for members. Documentation describing a metadata table is provide at step 600 and the documentation is compiled at step 610. For example:

```
/// <summary>
///     This is an XML documentation comment. When run through the
        compiler
///     this comment will be extracted into a separate XML file.
/// </summary>
public void MyMethod( ) { }
```

With sufficient tool support, these documentation comments could also contain attribute definitions. This allows the compiler to automatically separate attributes from code at step 620.

Separated XML documentation files are of little use by themselves. For example, without transformation, a help engine may not be able to display them. Help documentation may be considered to be just another form of metadata, instead of a separate artifact. A help engine could be coded to use the metadata store to locate "documentation metadata", which would eliminate the need for each help engine to invent its own registration scheme. Without some sort of packaging and registration scheme, even transformed XML files will likely not be found by a help engine. Lack of documentation support in this situation is non-ideal, but once metadata attributes are intermixed, actual behavior could break if these XML files could not be indexed and loaded by the lookup mechanism. By providing tools that can merge XML documentation files into generic "metadata assemblies", at step 630, several scenarios are available. The metadata assemblies can be loaded by the lookup mechanism described above. Additionally, help documentation for aspects of a framework become additional metadata that can be queried and loaded by standard managed APIs.

Figure 7:
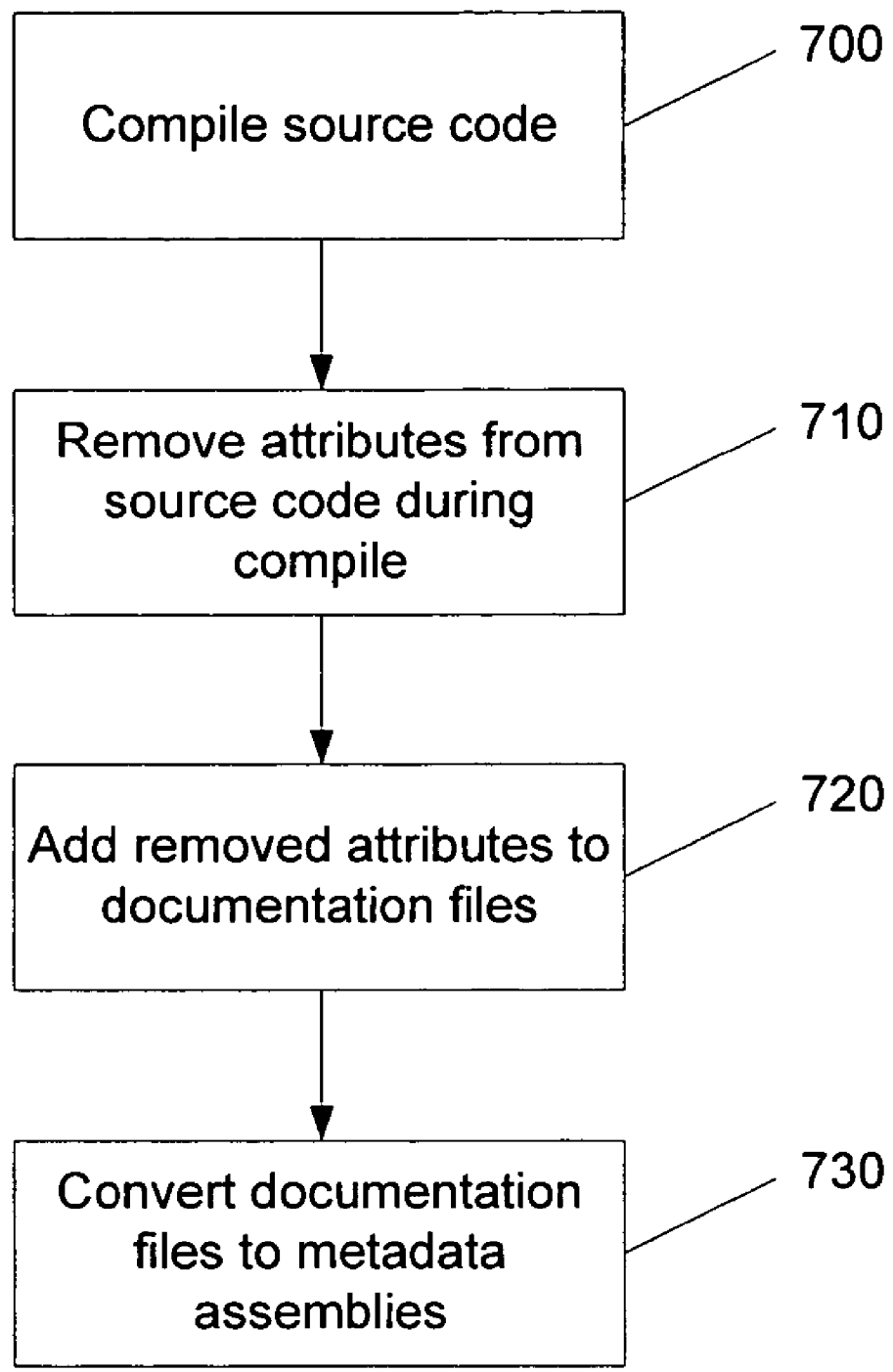
FIG. 7 is a diagram of an example splitting from source process.

FIG. 7 is a diagram of another example mechanism for building a metadata table. Source code is compiled at step 700. Splitting metadata from source removes attributes from source code during compile at step 710. These removed attributes may be added to XML documentation files at step 720. The documentation files can later be converted to metadata assemblies at step 730, as described above, for example. An issue is knowing which attributes are safe to remove. A description attribute, for example:

```
[Serializable]
[Description("This is a globally unique identifier.")]
public class Guid { }
``` can be removed from code and transferred to a metadata assembly. Removing the serializable attribute, however, can severely impact runtime behavior. In order to determine which attributes are safe to move to a secondary assembly and which are not, a property can be added e.g., to AttributeUsageAttribute:

```
[AttributeUsage(AttributeTargets.All, Removable = true)]
public sealed class DescriptionAttribute : Attribute { }
```

Attributes that are decorated on source code will be removed when the compiler is signaled to produce documentation files.

A metadata or attribute table is a read only piece of data. In order to build an attribute table, a class may be provided, e.g., an AttributeTableBuilder, that can be used to create an attribute table. Attribute builders have methods that can be called to add metadata. Builder methods also desirably support callback delegates so the entire process can be deferred until desired.

An example API for an attribute builder is as follows:

```
public class AttributeTableBuilder {
    // Allows demand population of type metadata
    public void AddCallback(Type type, AttributeCallback callback);
    // To allow merging of tables.
    public void AddTable(AttributeTable table);
    public void AddCustomAttributes(Type type, params Attribute[ ]
      attributes);
    public void AddCustomAttributes(Type ownerType,
                    MemberDescriptor descriptor,
                    params Attribute[ ] attributes);
    public void AddCustomAttributes(Type ownerType,
                    DependencyProperty dp,
                    params Attribute[ ] attributes);
    public void AddCustomAttributes(Type ownerType,
                    MemberInfo member,
                    params Attribute[ ] attributes);
    public void AddCustomAttributes(Type ownerType,
                    string memberName,
                    params Attribute[ ] attributes);
    public AttributeTable CreateTable( );
    public void ValidateTable( );
}
public delegate void AttributeCallback(AttributeCallbackBuilder builder);
```

A developer can create an attribute table builder and then call one or more of the Add methods in order to add attributes to the table. When a developer is finished adding attributes through an AttributeTableBuilder, the developer may call CreateTable to create an attribute table. Alternately, a developer may call ValidateTable, which walks through the table and ensures that the members and types referenced in the table correspond to actual types and actual members.

An AddCallback method may be used to optimally build an attribute table:

```
AttributeTableBuilder b = new AttributeTableBuilder( );
b.AddCallback(typeof(FrameworkElement),
delegate(AttributeCallbackBuilder builder) {
    builder.AddCustomAttributes(FrameworkElement.WidthProperty,
        new TypeConverterAttribute(typeof(LengthConverter)),
        new DescriptionAttribute("This is the width"));
});
```

Using this delegate format, no attributes are desirably constructed until metadata for the type is requested. The AttributeTableBuilder transfers this callback information into the AttributeTable and preserves it, so these callback delegates may be only invoked on demand. Once invoked, their results may be cached by the AttributeTable.

Example Computing Environment

Figure 8:
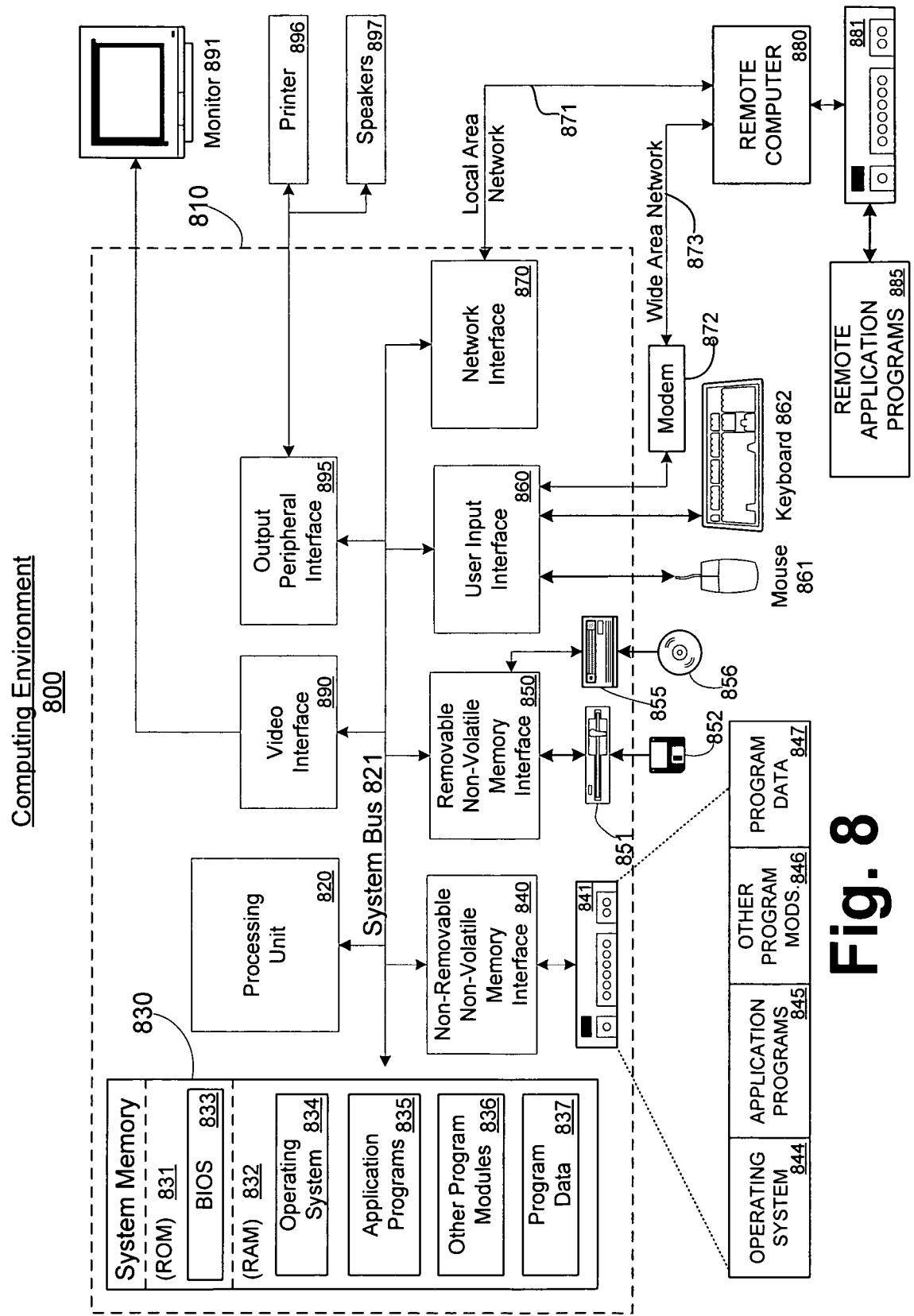
FIG. 8 is a block diagram showing an example computing environment.

FIG. 8 and the following discussion are intended to provide a brief general description of a suitable computing environment in which an example embodiment may be implemented. It should be understood, however, that handheld, portable, and other computing devices of all kinds are contemplated for use. While a general purpose computer is described below, this is but one example. Aspects and/or embodiments may be operable on a thin client having network server interoperability and interaction. Thus, an example embodiment may be implemented in an environment of networked hosted services in which very little or minimal client resources are implicated, e.g., a networked environment in which the client device serves merely as a browser or interface to the World Wide Web.

Although not required, example embodiments or aspects can be implemented via an API, for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that other computer system configurations can be used. Other well known computing systems, environments, and/or configurations that may be suitable include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment may also be practiced in distributed computing environments where tasks are performed by remote processing devices that are linked through a communications network or other data transmission medium. In a distributed computing environment, program modules may be located in both local and remote computer storage media including memory storage devices.

FIG. 8 thus illustrates an example of a suitable computing system environment 800, although the computing system environment 800 is only one example of a suitable computing environment and is not intended to suggest any limitation as to the scope of use or functionality. Neither should the computing environment 800 be interpreted as having any dependency or requirement relating to any one or combination of components illustrated in the exemplary operating environment 800.

With reference to FIG. 8, an example system includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 810 typically includes a variety of computer readable media. Computer readable media can be any available media that can be accessed by computer 810 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 830 includes computer storage media in the form of volatile and/or nonvolatile memory such as ROM 831 and RAM 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837. RAM 832 may contain other data and/or program modules.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8 provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus 821, but may be connected by other interface and bus structures, such as a parallel port, game port or a universal serial bus (USB).

A monitor 891 or other type of display device is also connected to the system bus 821 via an interface, such as a video interface 890. In addition to monitor 891, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

One of ordinary skill in the art can appreciate that a computer 810 or other client devices can be deployed as part of a computer network. In this regard, any computer system having any number of memory or storage units, and any number of applications and processes occurring across any number of storage units or volumes may be used. An embodiment may apply to an environment with server computers and client computers deployed in a network environment, having remote or local storage. An embodiment may also apply to a standalone computing device, having programming language functionality, interpretation and execution capabilities.

The various systems, methods, and techniques described herein may be implemented with hardware or software or, where appropriate, with a combination of both. Thus, the methods and apparatus, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus. When implemented on a general-purpose processor, the program code combines with the processor to provide a unique apparatus that operates to perform the functionality.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for providing metadata, the method comprising:
   receiving, in a computer, source code comprising metadata and runtime components;
   separating the metadata from the runtime components by generating the metadata from the source code;
   building a plurality of metadata tables containing custom metadata for one or more classes of objects by invoking a callback delegate only when the custom metadata for a class of an object is requested;
   modifying the metadata by accessing a metadata store in a memory device, the metadata store comprising the plurality of metadata tables and injecting at least one metadata table into the metadata store;
   tying the modified metadata back to the runtime components; and
   providing the modified metadata to a global assembly cache.

2. The method of claim 1, wherein the runtime components are comprised within an application programming interface (API).

3. The method of claim 1, wherein modifying the metadata comprises accessing the metadata store via a lookup mechanism.

4. The method of claim 3, wherein the metadata store comprises metadata tables containing attributes.

5. The method of claim 1, wherein building the metadata tables comprises a process involving imperative code, declarative markup, or splitting metadata from source.

6. The method of claim 4, further comprising receiving a query and locating an attribute in a metadata table responsive to the query.

7. The method of claim 3, wherein the metadata store comprises a type description provider for a type.

8. The method of claim 3, further comprising the metadata store providing common language runtime (CLR) metadata to a reflection application programming interface (API).

9. A method of providing a metadata store with a metadata table, the method comprising:
- receiving, in a computer, source code comprising a plurality of attributes;
- building a metadata table containing attributes for one or more classes of objects by, during compilation of the source code, removing from the source code attributes that are designated by a removability property as safe to remove, transferring the removed attributes to a documentation file stored in a memory device, and converting the documentation file to the metadata table by invoking a callback delegate only when the attributes for a class of an object is requested;
- receiving criteria at a lookup mechanism;
- finding the metadata table based on the criteria;
- injecting the metadata table into the metadata store; and
- registering the metadata table with a global assembly cache.

10. A system comprising:
- a processor;
- a memory;
- a metadata store residing in the memory and comprising a plurality of metadata tables, each metadata table containing custom metadata for one or more classes of objects; and
- a lookup mechanism configured and arranged to access the metadata store and to inject a metadata table into the metadata store,
- wherein the processor is configured to receive source code comprising a plurality of attributes and to build the metadata table by, during compilation of the source code, removing from the source code attributes that are designated by a removability property as safe to remove, transferring the removed attributes to a documentation file stored in the memory, and converting the documentation file to the metadata table by invoking a callback delegate only when the custom metadata for a class of an object is requested.

11. The system of claim 10, wherein the lookup mechanism is adapted to receive criteria, locate the metadata table based on the criteria, and inject the metadata table in to the metadata store.

12. The system of claim 10, wherein the metadata store is an object that maintains a list of metadata tables.

13. The system of claim 10, wherein the metadata store declares a type description provider for a type.

* * * * *